United States Patent
Zettel et al.

(10) Patent No.: US 7,421,650 B2
(45) Date of Patent: Sep. 2, 2008

(54) METHOD AND SYSTEM FOR PUBLISHING ELECTRONIC MEDIA TO A DOCUMENT MANAGEMENT SYSTEM IN VARIOUS PUBLISHING FORMATS INDEPENDENT OF THE MEDIA CREATION APPLICATION

(75) Inventors: Ignatius M. Zettel, New Berlin, WI (US); Kevin R. Clayton, Waterloo, WI (US)

(73) Assignee: General Electric Company, Schenectady, NY (US)

( * ) Notice: Subject to any disclaimer, the term of this patent is extended or adjusted under 35 U.S.C. 154(b) by 1349 days.

(21) Appl. No.: 09/681,573

(22) Filed: May 1, 2001

(65) Prior Publication Data
US 2002/0165882 A1    Nov. 7, 2002

(51) Int. Cl.
  *G06N 3/00*    (2006.01)
(52) U.S. Cl. ..................................................... 715/239
(58) Field of Classification Search ................. 715/530, 715/517, 513, 523, 239
  See application file for complete search history.

(56) References Cited

U.S. PATENT DOCUMENTS

| | | | |
|---|---|---|---|
| 4,573,141 A | | 2/1986 | Simon |
| 5,173,853 A | * | 12/1992 | Kelly et al. ................. 715/530 |
| 5,251,314 A | * | 10/1993 | Williams .................... 707/101 |
| 5,629,846 A | | 5/1997 | Crapo |
| 5,634,054 A | | 5/1997 | Sarachan |
| 5,727,156 A | * | 3/1998 | Herr-Hoyman et al. ..... 709/219 |
| 5,813,009 A | * | 9/1998 | Johnson et al. ............. 707/100 |
| 6,009,442 A | * | 12/1999 | Chen et al. ................. 715/522 |
| 6,044,372 A | * | 3/2000 | Rothfus et al. ................ 707/10 |
| 6,092,090 A | * | 7/2000 | Payne et al. ................. 715/530 |
| 6,182,095 B1 | | 1/2001 | Leymaster et al. |
| 6,243,722 B1 | * | 6/2001 | Day et al. ................... 715/512 |
| 6,336,124 B1 | * | 1/2002 | Alam et al. ................. 715/523 |
| 6,370,567 B1 | * | 4/2002 | Ouchi ........................ 709/206 |
| 6,725,429 B1 | * | 4/2004 | Gardner et al. ............. 715/530 |
| 2002/0002563 A1 | * | 1/2002 | Bendik ....................... 707/500 |
| 2002/0156904 A1 | * | 10/2002 | Gullotta at al. ............. 709/229 |
| 2004/0070609 A1 | * | 4/2004 | Estrada ....................... 345/751 |

OTHER PUBLICATIONS

"Adobe PDF for Electronic Publishing," 1999, Academic Technology Center, pp. 1-24.*

* cited by examiner

*Primary Examiner*—Stephen Hong
*Assistant Examiner*—Kyle R Stork
(74) *Attorney, Agent, or Firm*—Ziolkowski Patent Solutions Group, SC

(57) ABSTRACT

A system and method of publishing an electronic data file to a document management system in various publication formats includes a printer driver that is configured to publish an electronic media to a document management system irrespective of which application or software program the data file was created. The printer driver is activated to facilitate publication of an electronic data file following a file-print command initialized while resident in a specific media creating program. The present invention further allows for user selection of a number of publication formats as well as providing notices to additional personnel indicating that the electronic data file is ready for additional work flow or review. The present invention further contemplates retrieval of media stored in a database managed by a document management system following the aforementioned file print command.

20 Claims, 5 Drawing Sheets

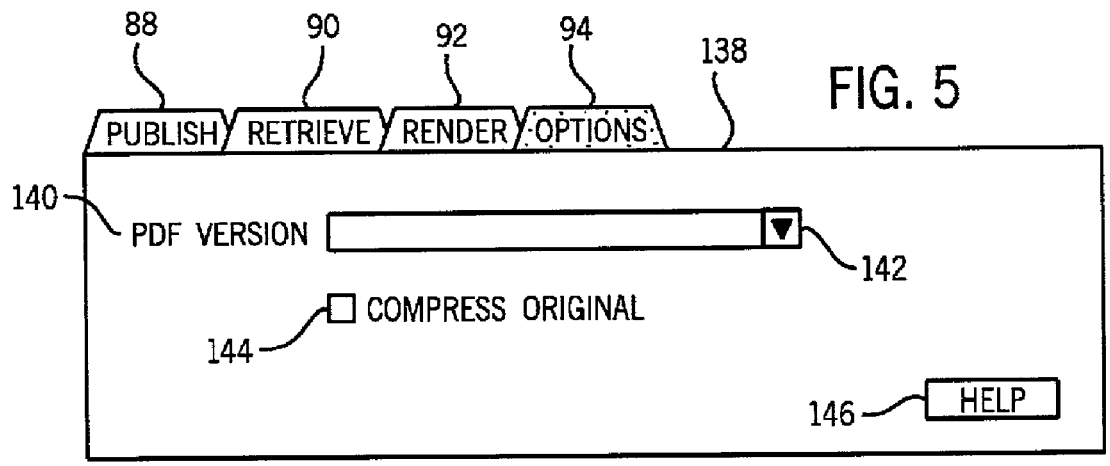
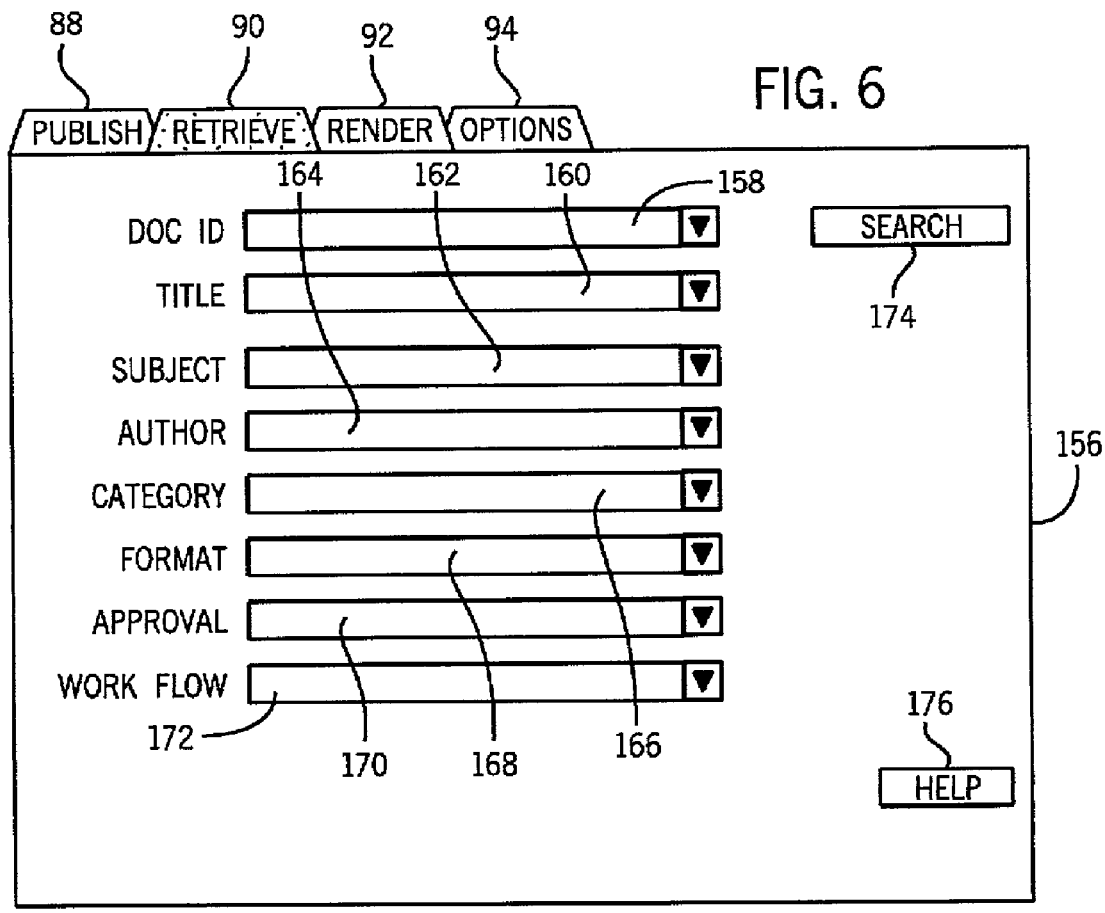

METHOD AND SYSTEM FOR PUBLISHING ELECTRONIC MEDIA TO A DOCUMENT MANAGEMENT SYSTEM IN VARIOUS PUBLISHING FORMATS INDEPENDENT OF THE MEDIA CREATION APPLICATION

BACKGROUND OF INVENTION

The present invention relates generally to document publication and, more particularly, to a method and system for publishing electronic media, such as a document to a document management system in a number of publishing formats independent of the document creation application.

It is generally well known that when software applications seek to print electronic media, the software applications or programs temporarily route control of the electronic document to a printing program commonly referred to as a "printer driver." When the programs route control to the printer driver, actual content of the electronic document or a representation of that document is available for printing to one of a number of system printers and other output devices. Once the printer driver has control of and/or access to the actual content of the electronic document or a representation thereof, the printer driver may perform a single printing or other outputting function. Further, regardless of which document creation application from which a user seeks to print, the same common screens or windows are displayed by the printer driver. Typically, the printer driver screens enable a user to select a particular system printer or other output device, and sometimes select output parameters. That is, the user may select a print range including a particular page, range of pages, or highlighted selection as well as identify a number of copies to print and select a collation option. Despite access to the content of the electronic document, known printer drivers or printing applications are unable to manipulate the content of the electronic document to service additional needs of the document creator and/or user.

Often a user desires to convert an electronic document from its native format to another format so that the content of the electronic document may be accessed more effectively and efficiently by another user. For example, a document may be created in English using a word processing application. The user, however, may desire that the content of the electronic document be available to another user who cannot effectively view the content of the electronic document because he or she uses a word processing application that is foreign to the format in which the electronic document was created. That is, the electronic document may have been originally created using a PC-based word processing application, but another individual seeking access to the content of the original electronic document may be unable to access the content since he or she uses a non-PC-based word processing application. Currently, some users attempt to circumvent this problem by converting the original electronic document into another document format, such as a portable document format (PDF). To convert the original electronic document to a PDF file, it is incumbent upon the user to initialize a second and independent application that is capable of completing the desired conversion and publication.

Accessing a second and independent application to achieve the user's goal, i.e., make the content of an electronic document available in a non-native format, often requires additional software that must be purchased to generate these additional file formats. Purchasing of additional software programs can be expensive and delay productivity for organizations and businesses with multiple users. Additionally, some organizations and businesses seek to alleviate the costs associated with purchasing multiple software programs by modifying the native document creation software applications. Manipulation of the original software application may be undesirable as such a step may constitute a breach of a licensing agreement with the software providers.

Also well known is the use of document management systems (DMS) to help manage the transfer of electronic information and actual document content between distributed authors/users. DMS's are becoming increasingly popular by businesses and organizations to maintain the systematic and organized storing of data on a shared database or server. DMS's enable users to effectively store as well as retrieve documents without, oftentimes, requiring the user to know the precise location where the electronic document is stored and/or to be retrieved from. Furthermore, DMS's allow a user to assign a number of identification criteria so that a document may be readily identified during a document search.

Since DMS's are quite commonplace in a large user environment, current integrated solutions to facilitate the adding of data files to the DMS in various document formats also require modifications to the native software application used to author the electronic document. These integrated solutions to DMS's include the adding of a button or menu option to the authoring application to perform the desired conversion function. For example, to convert a document to a portable document format, a button or menu option to facilitate the conversion of the electronic document to a PDF format is added to the native software application. Again, however, manipulating the software applications to include additional buttons or menu options to facilitate conversion of the content of an electronic document to a non-native format requires maintaining an abundance of software applications that, in most circumstances, is cost prohibitive.

It would therefore be desirable to design a printer driver for publishing electronic media to a document management system in a number of publishing formats without requiring a user to activate a non-native document creation application. It would further be desirable to construct a computer program that may publish electronic media in a number of media formats and may be implemented with a number of media creation applications capable of printing electronic media.

SUMMARY OF INVENTION

A method and system for publishing electronic media, such as an electronic document, in a number of publishing formats independent of the document creation application overcoming the aforementioned drawbacks are provided.

The invention allows a user to publish an electronic document from multiple software applications or programs capable of printing an electronic document thereby simplifying publication and management of electronic documents. Further, the present invention includes a software program capable of managing the publication of an electronic document wherein the software program includes a printer driver that is applicable with virtually all known applications capable of printing a document. Since the present invention may be implemented as a printer driver at the operating system level, installation as well as cross application implementation is readily achieved. The present invention also allows a user to manage file input/output and other related transactions related to the electronic document without a high level of user intervention or training. Furthermore, the present invention provides application developers a flexible development tool for publishing electronic documents to a document management system in a number of publication formats.

Therefore, in accordance with one aspect of the present invention, a method to electronically publish documents is disclosed. The method includes the steps of accessing an electronic data file from either a memory location or a document creation application and receiving a publication instruction from a user to publish the accessed data file. Next, a publication enabler capable of converting a data file into at least one publication format is initialized. The method further includes the steps of selecting a publication format via the publication enabler and, if necessary, converting the accessed data file into another publication format. The method also includes the step of publishing the data file in the another publication format.

In a further aspect of the present invention, a computer program is provided to publish electronic documents in a number of document formats. The computer program includes a set of instructions that when executed by a computer causes the computer to identify a command from a user to manage an electronic document and further causes the computer to access the electronic document. The computer program also causes the computer to initialize a document publisher separate from a document creation application wherein the document publisher is configured to control publication of the electronic document and to transform the content of the electronic document into a number of document formats. The computer is further caused to receive a document control instruction from the user to transform the content of the electronic document into the at least one document format. The set of instructions further causes the computer to publish the content of the electronic document in accordance with the received document control instruction.

In yet a further aspect of the present invention, a printer driver embodied in a sequence of instructions is provided. The printer driver causes a processor to access an electronic data file and display a graphical user interface (GUI) configured to facilitate user selection of a number of publication commands. The printer driver further causes the processor to receive a user selection of at least one publication command and to convert the electronic data file into at least one of a number of publication formats in accordance with the received at least one publication command. The printer driver further causes a processor to transmit the converted data file to at least one publication system capable of publishing the converted data file in the at least one publication format.

In a further aspect of the present invention, a system for publishing media to a document management system includes a computerized network, a readable memory electronically linked to the network, and a plurality of computers connected to the network. The plurality of computers are configured such that at least one of the plurality of computers displays electronic data to a user in the form of a graphical user interface. A processing unit is also provided and programmed to call the GUI on demand and enable a user selection of one or more publication formats, wherein the one or more publication formats include publication formats non-native to a document creation format. The processing unit is further programmed to convert a document to at least one of the publication formats.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention. In the drawings:

FIG. 5 is a representation of a graphical user interface used for selecting a portable document format version in accordance with the present invention.

FIG. 6 is a representation of a graphical user interface for selecting search criteria for locating a document stored in a database in accordance with the present invention.

DETAILED DESCRIPTION

Figure 1:
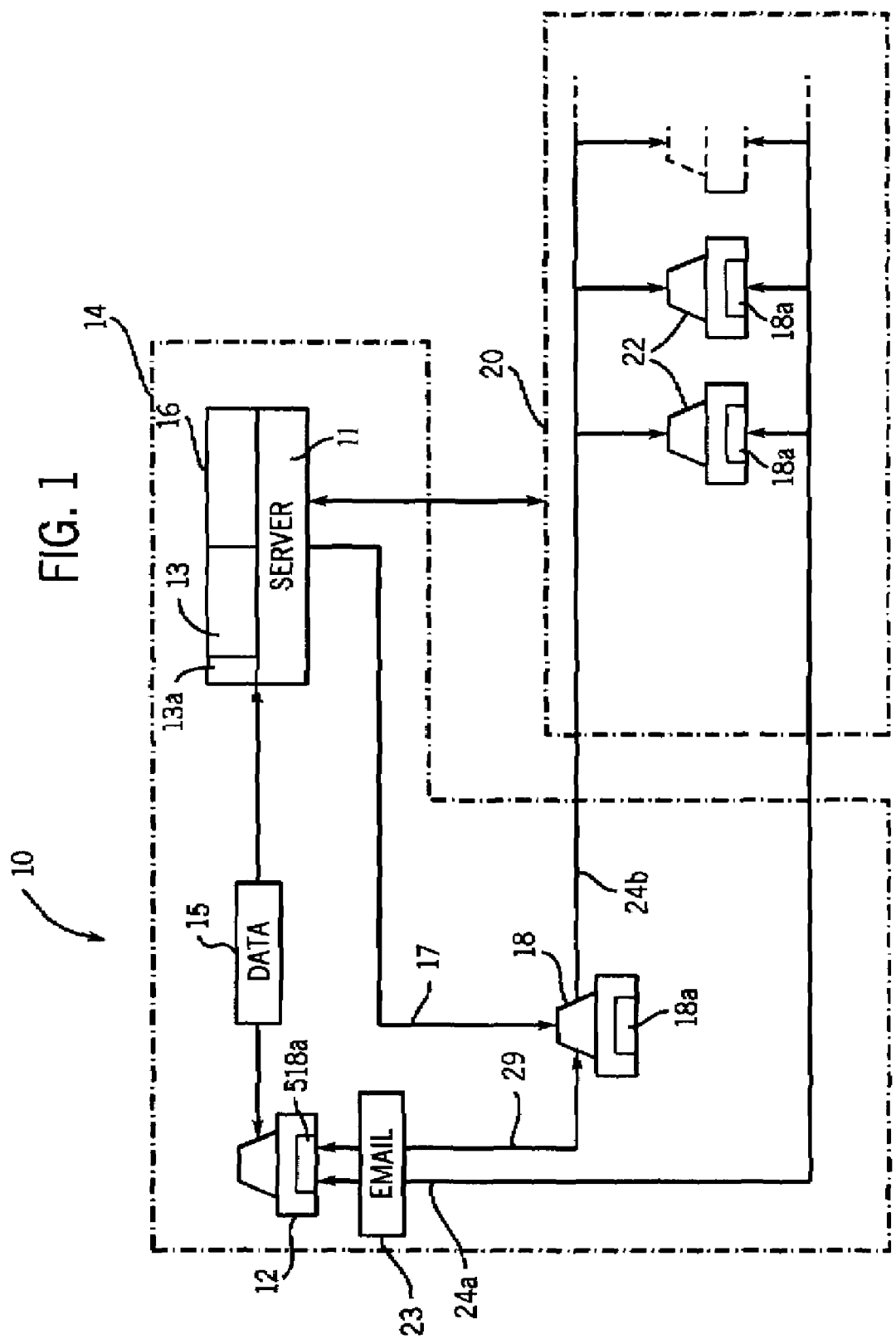
FIG. 1 is a schematic block diagram showing the hardware layout of a system incorporating the present invention.

Referring to FIG. 1 a computerized system 10 for printing and publishing electronic media, can include a local area network (LAN) 14 and/or a wide area network (WAN) 20. Together the LAN 14 and the WAN 20 can form an organizational intranet. The LAN 14 preferably includes a plurality of user terminals 12 for creating electronic media 15, such as word processing documents and the like. The data 15 is routed to a server/computer 11 where it is stored in a database in memory 13 as an electronic file. The server/computer 11 includes a processor 16 for processing data, search requests, routing data, and other such server functions. The server 11 is connected to a communications network 14 by a connection port 17 which connects the network to other terminals and work stations 18 in the local area. Each terminal and workstation is equipped with a monitor 18a and may be connected to a printer or other output devices, such as fax machines, plotters, photo-copiers, and so forth (not shown). The terminals or work stations 18 are connected to the user terminal 12 via a connection link 29 such that the users of terminal 12 and terminal 18 can share data and other information via electronic mail 23 within the LAN 14.

The users of terminals 12, 18 in the network 14 may also be connected to remote users via a plurality of terminals 22 in the WAN 20 which may include numerous stand alone computers, terminals or work stations. Additionally, terminals 12 and 18 may be independently linked to the WAN 20 via links 24a, 24b which may include fiber optic lines, a direct modem link, or a global communications network, such as the Internet. This communications configuration allows employees or users of the system 10 to remotely access the system 10 from many different locations, including sales offices, managers" office, human resources offices, or home offices, all of which may be located anywhere in the world.

System 10 is configured to allow for the sharing of data 15 in electronic form as saved in a database 13a. The information from the database 13a may be accessed and displayed to the users at terminals 12, 18, and 22 using one of a number of host applications. For example, a document may be viewed using a document processing application, an image or portable document format viewer, or web page browser.

Some types of data that are stored in database 13a and available to the users includes an entire organization's shared electronic media including spreadsheets, images, web pages, portable documents, word processing documents, publishing media, and fax documents. Additional data stored in database 13a includes a document title, subject, author, ID, and creation/last access date. Further, a particular document may be identified by format, approving supervisor, or workflow recipient.

The present invention will be described with particular reference to publication of an electronic spreadsheet document, but a person having ordinary skill in the art will appreciate that the present invention is also applicable with printable electronic media and other printable documents. Further, the present invention will be described for use with a document management system, however, the present invention may be applied and fully implemented without a document management system. Also, the present invention will be described independent of a specific document creation software program, but one of ordinary skill in the art will appreciate that the present invention may also be implemented and utilized with any document creation and/or editing program.

Figure 2:
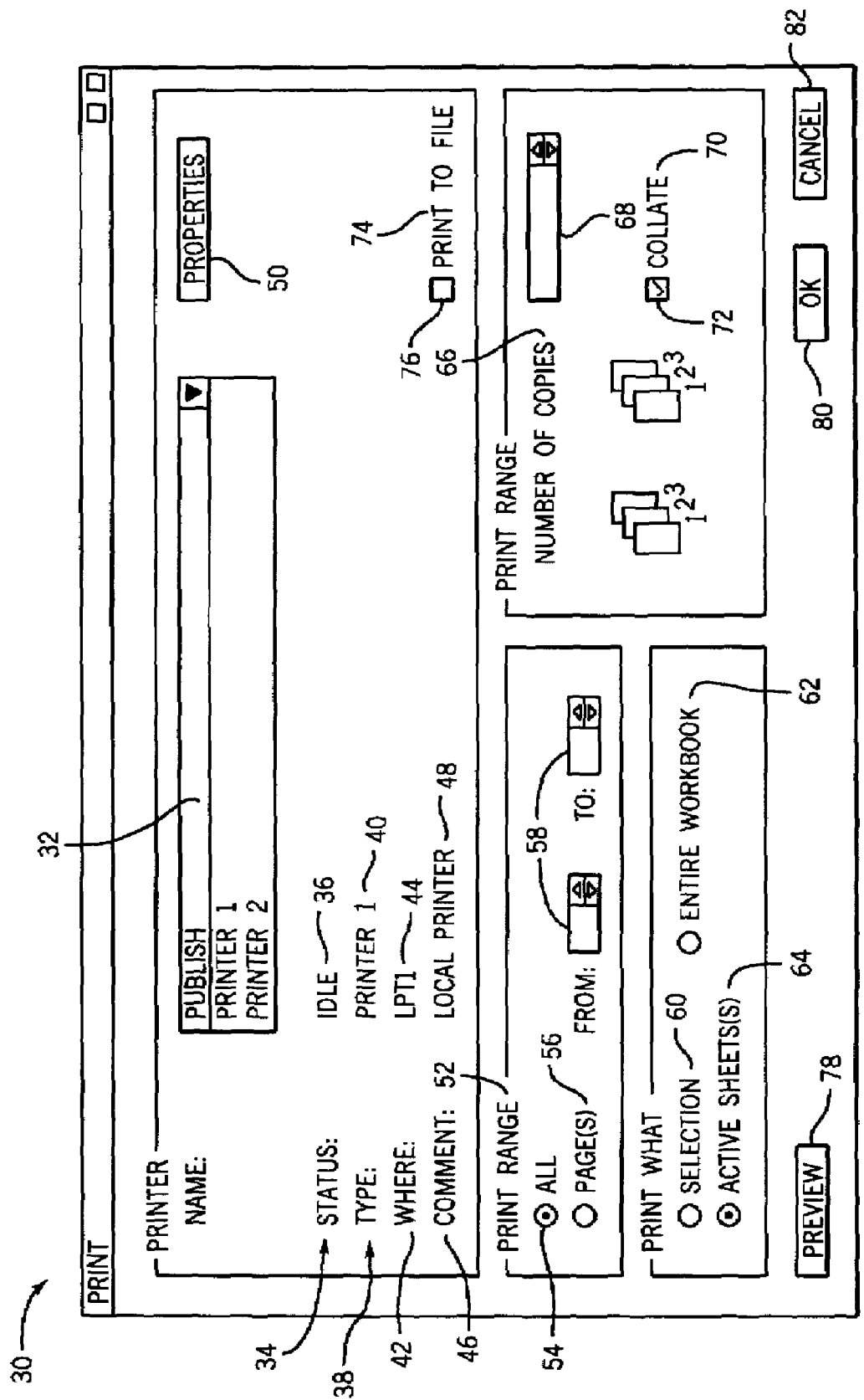
FIG. 2 is a representation of a graphical user interface commonly activated in response to printer driver activation.

Referring to FIG. 2, a graphical representation of an initial "publication" graphical user interface (GUI) 30 or window is shown. GUI 30 becomes visible to a user who desires to publish an electronic document. GUI 30 appears if the user is desiring to publish an electronic document from a document creation application or following any print command, such as, a print screen command or a user instruction to print a data file or document directly from a document storage location in memory without initializing the document creation application directly. That is, GUI 30 is uploaded to facilitate printing or publishing of an electronic data file following any print instruction from a user. Moreover, GUI 30 becomes visible to the user regardless of the means by which the user conveys the printing instruction. Therefore, GUI 30 will facilitate printing or publishing of the electronic data file regardless of whether the user depressed a virtual printer button within an application, carried out "file-print" steps within a document creation application, or depressed one or more keys of the keyboard to transmit a print instruction.

Still referring to FIG. 2, GUI 30 includes a drill-down menu 32 wherein the number of output devices that may be used by the user to output the electronic data file. For example, drill-down menu 32 may include a listing of a number of shared network printers, a faxing machine to facilitate facsimile transmission of the electronic data file, or, in accordance with the present invention, a "publishing" option. GUI 30 further includes a number of printing parameters commonly associated with a print screen. The additional printing parameters include a status indicator 34 that typically indicates whether the selected output device is busy or idle 36, an output device type indicator 38 wherein the type of output device is clearly identified 40, and an output port by which the electronic data file will be transmitted to the output device 42 and 44. Further, a comment identifier 46 is provided wherein additional information regarding the selected output device 48 is displayed to the user. Comments 48 may include an indication as to whether the selected output device is a local printer or a stand-alone device. A properties button 50 is also provided that, upon user instruction, displays a properties window that enables the user to view and/or change the properties of the selected output device. Providing a properties window in this manner is well known.

GUI 30 further provides a print range selector 52 that enables the user to indicate whether all of the data file should be printed 54 or allow the user to identify selected pages 56 of the electronic data file by selecting a page range using page selectors 58. The present invention further contemplates a current page selector (not shown) to allow the user to print the page in which a cursor is presently resided. In a spreadsheet application and as shown in FIG. 2, GUI 30 also enables the user to further select the portions of the electronic data file to be printed. For example, GUI 30 allows the user to select for printing a particular selection 60, an entire workbook 62, or, as shown in FIG. 2, select active sheets 64. GUI 30 further includes additional features that allow the user to select the number of copies 66 using a drill-down menu 68 as well as allow the user to select a collating option 70 by placing a virtual check in box 72. The user may also instruct that the electronic data file be "Printed to File" 74 by also placing a virtual check in box 76. GUI 30 also includes a preview tab 78 that allows the user to preview the electronic document file as to how it will appear as printed prior to the actual printing. Once all the parameters have been selected by the user, the user depresses "OK" button 80 to carry out printing of the electronic data file in accordance with the selected parameters. The user may also cancel printing, publishing, and otherwise routing of the electronic data file to the selected output device 32 by depressing cancel tab 82.

Figure 3:
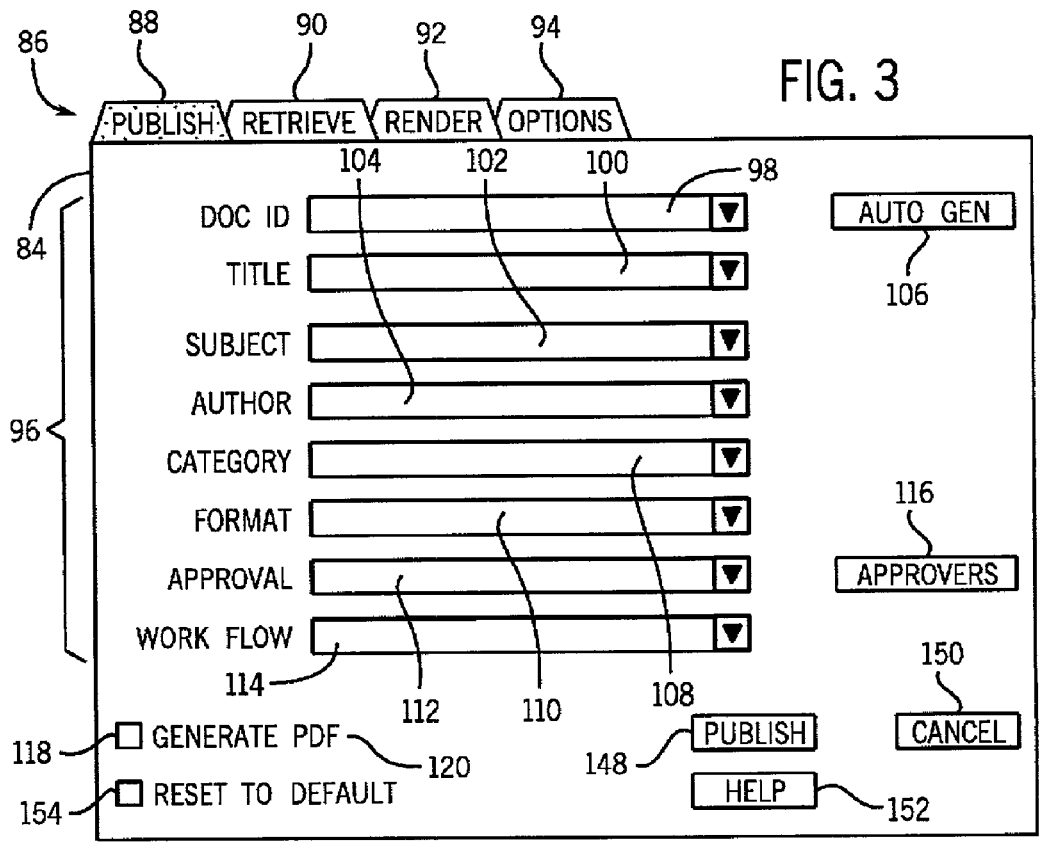
FIG. 3 is a representation of a graphical user interface for identifying a number of document parameters in accordance with the present invention.

Now referring to FIG. 3, a publish GUI 84 allows the user to select and/or input a number of publication parameters for the electronic data file. GUI 84 becomes visible to the user by the user selection of publish and drill down menu 32 of FIG. 1 and depressing the "OK" button 80. The present invention also contemplates that GUI 84 will become visible to the user with the user selection of "Publish" in drill-down menu 32 followed by user depressing of properties button 50. GUI 84 is one of a number of GUIs or windows for carrying out a publication instruction. The additional GUIs associated with publishing the electronic data file may be accessed by depressing any of the window tabs 86 that, as shown in FIG. 3, are positioned along the uppermost portion of GUI 84. In the present invention, additional GUIs associated with publishing the electronic data file include a "Publish" tab 88 that upon depressing displays GUI 84, a "Retrieve" tab 90, a "Render" tab 92, and an "Options" tab 94 that will be discussed with particular reference to FIGS. 4-6, respectively.

Still referring to FIG. 3, GUI 84 allows the user to enter and/or select a number of publication parameters 96. The publication parameters include a document ID 98, a document title 100, a document subject 102, and an author identification field 104. The present invention allows the user to enter the document ID 98, title 100, subject 102 and author 104 or may elect to have a document management system automatically generate the document ID 98, title 100, subject 102, or author 104 by depressing "AUTOGEN" button 106. Preferably, however, the user should limit the document management system's generation of document parameters to the document ID 98. This allows the user to input a title 100, subject 102, and author 104 so that the user may readily identify or search for the electronic document based on one of those parameters 100-104.

Document parameters 96 further include a category selector 108 that enables the user to drill down a menu and select a category for which the electronic data file pertains. Further, a format selector or drill down menu 110 is provided that allows the user to select a document format for which the electronic document should be published in to the document management system. That is, the present invention allows the user to select for publication a document format 110 that is foreign to the format in which the electronic document was created. That is, the present invention allows the user to change the format of the electronic document from the default format to another more desired format. For example, the user may elect that the electronic data file be published to the document management system as a text file (.txt), a rich text format (.rtf), or a DjVu (.djvu) format rather than the default document file (.doc). DJVU® is a registered trademark of AT&T Corporation. The various formats that an electronic data file may be converted to can include, but are not limited to, the following formats: hypertext markup language, portable document format, fax compression, bitmap, encryption, x markup language, joint photographic experts group format, slide format and/or presentation graphics interchange file format, compression formats, and so forth.

The printer driver of the present invention further enables the user to notify an approving supervisor 112 and a workflow recipient 114 that the electronic document is ready for their review or continued involvement. That is, the present invention allows the user to identify those individuals with supervisory authority that, subject to organizational or business protocol, are required to approve the electronic document.

The present invention further provides that a supervisor be notified by electronic message that the electronic document is stored on the database and may be accessed therefrom. Additionally, the printer driver of the present invention allows the user to designate one or more individuals who are to be notified that the electronic document has been prepared and stored on the database so that these notified individuals may continue any workflow associated with the electronic document. For example, a workflow recipient may require the document as part of a larger presentation file or other composition work. The present invention contemplates several mechanisms for notifying a supervising approver or a workflow recipient including electronic message as well as, automatic voicemail messages or pages.

Still referring to FIG. 3, GUI 84 further includes an "Approvers" button 116. By depressing Approvers button 116, the user is able to see a complete listing of available supervising approvers for appropriate notification of completion of the electronic document. In one embodiment, the approvers button 116 displays not only a list of supervisors, but also contact information including title, department, email address, and telephone number. Additionally, the printer driver of the present invention contemplates selection of multiple approvers 112 as well as multiple workflow recipients 114. Multiple selection may be achieved using any conventional means such as a "CTRL+Shift" command for selecting multiple elements of a drill down menu such as menus 112 and 114.

Still referring to FIG. 3, the present invention contemplates a special document conversion of transforming the content of the electronic data file to a portable document format (PDF) file. The user may signal a desire to transform the content of the electronic data file to a PDF file by placing a check in box 118 corresponding to "Generate PDF" 120. Creation of a PDF document facilitates publishing of the content of the data file without giving access to the original electronic data file to a recipient thereby preventing the recipient from altering the contents of the electronic data file or document. Further, converting the content of the electronic data file to a PDF without launching a separate conversion software program or application allows the user to efficiently prepare the electronic data file for viewing by a subsequent user or recipient who lacks appropriate software applications or programs to view the electronic data file or document in its native format or any of the other formats selected by the user at 110. Additionally, transformation of the electronic data file to a PDF file allows the user to transmit the contents of the electronic data file without granting access to the database on which the electronic data file is stored and further limit the ability of the recipient to alter the contents of the electronic data file. That is, conversion to a PDF file allows the user to maintain a permanent record of the contents of the electronic data file as of the date the PDF file was created.

Figure 4:
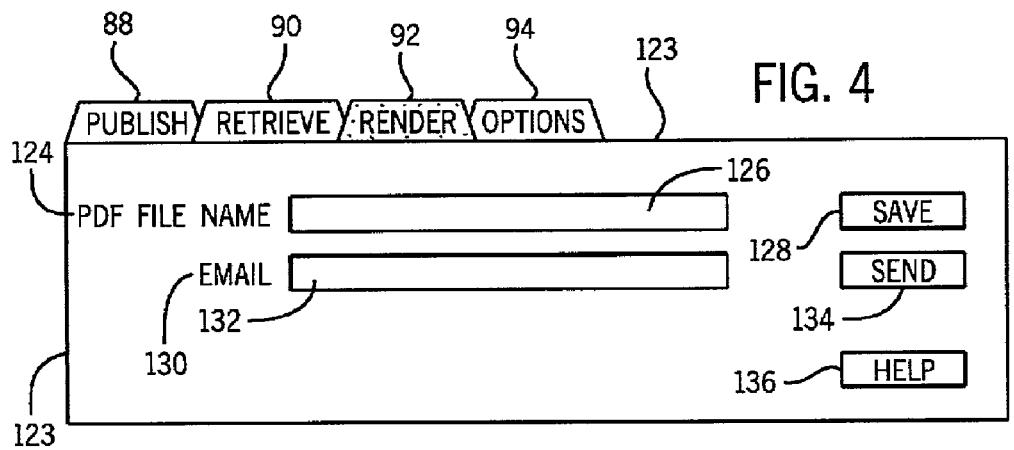
FIG. 4 is a representation of a graphical user interface used to generate a portable document format file in accordance with the present invention.

Now referring to FIG. 4, if the user chooses to generate a PDF file by placing a check in box 118, FIG. 3, the user may display GUI 132 by selecting "Render" tab 92 and may assign a PDF file name 122 to the PDF file. The user may enter a PDF filename in field 126 and save the PDF filename by depressing button 128. GUI 123 further allows the user to input an email address 130 in field 132 and send the PDF file to the identified email address 132 by depressing "Send" button 134. Further GUI 123 includes a "Help" tab 136 that upon a user pushbutton instruction will display a "Help" menu to assist the user in completing the fields of GUI 123 as well as provide additional information regarding publishing of the electronic data file to both an outside recipient as well as the document management system.

Referring to FIG. 5, an options GUI 138 is viewable upon depressing of "Options" tab 94 to allow the user to select a PDF version 140 by drilling down menu 142. Additionally, GUI 138 enables the user to elect to compress the original electronic data file by checking box 144. Compressing the original electronic data file reduces the amount of memory required to store the electronic data file on the database. A "Help" button 146 is also provided to assist, upon user selection, the user in determining if the original of the electronic data file should be compressed as well as assist in determining which PDF version 140 should be selected.

Referring again to FIG. 3, once the user has input a desired PDF filename and chosen the appropriate version the user may publish the electronic data file in accordance with each of the entered and selected parameters by depressing "Publish" tab 148. By doing so, the user is instructing the printer driver to publish the document to the document management system consistent with the parameters identified. Depressing "Publish" button 148 also causes automatic notification to the selected supervising approvers 112 as well as any identified workflow recipients 114. GUI 84 further includes a "Cancel" tab 150 that upon depressing by user cancels the publication process as well as a "Help" tab 152 that upon user selection provides information to the user to assist with the publication process. GUI 84 further includes a "Reset to Default" indicator 154 that allows the user to reset all of the entered values to default values. For instance, a default format 110 may be used but during the pre-publication process the user selected an alternate publication format 110. Essentially, the "Reset to Default" selection 154 allows the user to return each field to a default value without having to enter the default data individually.

The present invention further contemplates retrieving of electronic data file following a publication command by the user. As shown in FIG. 6, the user may depress "Retrieve" tab 90 to display the various fields by which a document may be searched. Enabling a user to retrieve a document as part of a publication or printing process alleviates the need for the user to separately activate a document management retrieval program or search the database. Retrieve GUI 156 allows the user to input a document ID in field 158, a title in field 160, a subject in field 162, and/or an author in field 164. Furthermore, the user may elect to search under a particular category by choosing a category of drill-down menu 166, a format from "Format" menu 168, or search by "Approver" in menu 170 or by workflow recipient in menu 172. The present invention allows the user to search by any or all of the searchable fields 158-172.

To complete a search of the database for a document identified by the search terms entered at 158-172, the user depresses "Search" button 174. Upon depressing "Search" tab 174, the document management system conducts a search of the database for those documents satisfying the search criteria and produces a search results page (not shown). The user may then select the appropriate document from the search result page or, if necessary, re-enter or reselect new search criteria to further identify the data file to be located. Again, a "Help" button 176 is provided to assist the user with the retrieving process.

The present invention includes a method for publishing electronic media in a number of publication formats to a document management system. The present invention further includes a computer program for carrying out the aforementioned steps of the method and description of the steps associated with that method as well as the acts associated with the computer program for carrying out the method are set forth below.

Figure 7:
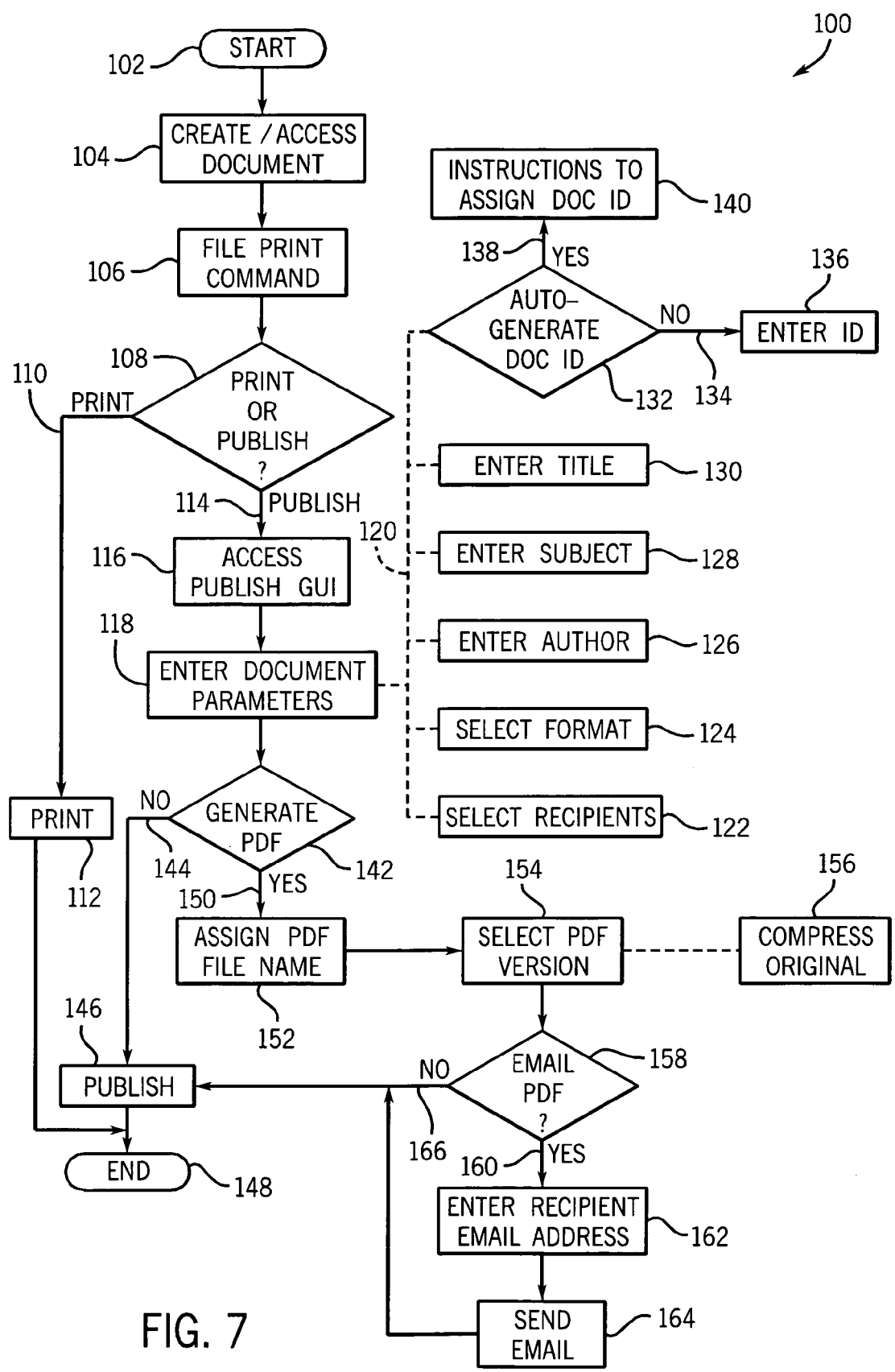
FIG. 7 is a flow chart illustrating the steps for carrying out the present invention and incorporated in a computer program.

Now referring to FIG. 7, process 100 begins at 102 with the creating or accessing an electronic media, document or data file 104. The user then conveys a file print command at 106. After instituting a file print command 106, the user selects between a print or publish command at 108. If at 108, the user selects a Print command 110, the electronic data file is printed at 112 in accordance with well known printing procedures. If however, the user selects to publish the electronic data file 108, 114, the user accesses a publishing GUI 116. At 118, the user inputs several document parameters associated with publishing the media/document.

As shown by phantom 120, one or more of the document parameters may be entered/selected and done without regard to any particular order. For example, the user may select at 122 one or more recipients who are to receive a notice that the electronic data file has been published to the document management system. The recipients that may be selected at 122 include workflow recipients or those individuals who are to be notified that a document has been prepared so that they may continue any workflow associated with that data file or document. The recipients may also include supervisor or document approvers who are to be notified that a document is completed so that they may approve the finality associated with that data file. One or more formats in which the document is to be stored may be selected at 124 and an author of the electronic data file identified at 126. The user may also input a subject at 128 as well as a data file title at 130. The process 100 further enables the user to enter a document ID alphanumeric code or to auto generate a document ID code at 132. If the user elects to not auto generate a document ID 134, the user may enter an ID accordingly at 136. Conversely, however, if the user elects for auto generation of the document ID 132, 138, a command is forwarded to the document management system to assign a document ID 140 upon storing the file or document to the database.

Still referring to FIG. 7, once the user inputs all desired document parameters 118-140, the user may also determine as to whether a PDF file should be generated at 142. If not 144, the document or data file is published at 146, at which point process 100 ends at 148. If the user elects to generate a PDF file 142,150, the user is instructed to assign a PDF filename to the electronic document at 152 as well as select a PDF version at 154. At 156, the user is afforded the opportunity to instruct the document management system to compress the original data file so as to reduce the amount of memory required to save the data file on the database. At 158, the user is able to select if the PDF file generated at 142, 150, should be forwarded by electronic message to a recipient. If the user decides to email the PDF file 158, 160, the user enters a recipient's email address at 162 and then instructs at 164 transmission of the PDF file to the email address entered at 162. After the user instructs the document management system to send the email at 164 or elects to not email the PDF file at 158, 166, the user instructs publication of the electronic data file in accordance with each of the entered parameters at 146 and at which point the process 100 concludes at 148.

In accordance with one embodiment of the present invention, a method to electronically publish media/documents is provided. The method includes the steps of accessing an electronic data file from either a memory location or a document creation application and receiving a publication instruction from a user to publish the accessed data file. Next, a publication enabler capable of converting a data file into at least one publication format is initialized. The method further includes the steps of selecting a publication format via the publication enabler and, if necessary, converting the accessed data file into another publication format. The method also includes the step of publishing the data file in the another publication format.

In a further embodiment of the present invention, a computer program is provided to publish electronic media in a number of formats. The computer program includes a set of instructions that when executed by a computer causes the computer to identify a command from a user to manage an electronic media and further causes the computer to access the electronic media. The computer program also causes the computer to initialize a document publisher separate from a document creation application wherein the document publisher is configured to control publication of the electronic media and to transform the content of the electronic media into a number of electronic formats. The computer is further caused to receive a document control instruction from the user to transform the content of the electronic media into the at least one electronic format. The set of instructions further causes the computer to publish the content of the electronic media in accordance with the received document control instruction.

In yet a further embodiment of the present invention, a printer driver embodying a sequence of instructions is provided. The printer driver causes a processor to access an electronic data file and display a graphical user interface configured to facilitate user selection of a number of publication commands. The printer driver further causes the processor to receive a user selection of at least one publication command and to convert the electronic data file into at least one of a number of publication formats in accordance with the received at least one publication command. The printer driver further causes the processor to transmit the converted data file to at least one publication system capable of publishing the converted data file in the at least one publication format.

In a further embodiment of the present invention, a system for publishing documents to a document management system comprises a computerized network, a readable memory electronically linked to the network, and a plurality of computers connected to the network. The plurality of computers are configured such that at least one of the plurality of computers displays electronic data to a user in the form of a graphical user interface. A processing unit is also provided and programmed to call the GUI on demand and enable a user selection of one or more publication formats, wherein the one or more publication formats include publication formats non-native to a document creation format. The processing unit is further programmed to convert a document to at least one of the publication formats.

The present invention has been described in terms of the preferred embodiment, and it is recognized that equivalents, alternatives, and modifications, aside from those expressly stated, are possible and within the scope of the appending claims.

The invention claimed is:

1. A system for publishing documents to a document management system comprising:
   a computerized network
   a readable memory electronically linked to the network;
   a plurality of computers connected to the network, wherein at least one of the plurality of computers, displays electronic data to a user in the form of a graphical user interface (GUI);
   a processing unit programmed to call the GUI on demand and enable a user selection of one or more publication formats, wherein the one or more publication formats conform to document management system parameters and include publication formats non-native to a creation document format; and
   wherein the processing unit is further programmed to convert a document to at least one of the publication formats and call the GUI directly from the application used to create the document a user desires to publish.

2. The system of claim 1 wherein the processing unit is further programmed to automatically generate a document management system document identifier and assign the document management system document identifier to the document.

3. The system of claim 1 wherein the processing unit is further programmed to automatically assign document management system publication parameters, wherein the document management system parameters include at least one of a document category, document format, document approval, and document workflow.

4. The system of claim 1 wherein the processing unit is further programmed to display a list of a number of supervisors approving and a list of a number of work flow document recipients upon a user instruction.

5. The system of claim 4 wherein the processing unit is further programmed to route the document to at least one of a supervising approver or a work flow document recipient upon a user instruction.

6. A computer readable storage device having stored thereon a program that when executed by a computer causes the computer to:
   identify a command from a media creation application to manage an electronic media;
   access the electronic media;
   initialize a media publisher independent of the media creation application and configured to control publication of the electronic media to a document management system, wherein the media publisher is further configured to transform the content of the electronic media into at least one publication format;
   receive a media control instruction from the media publisher to transform the content of the electronic media into at least one publication format;
   publish the content of the electronic media directly into the at least one publication format in accordance with the received media control instruction and storage rules of the document management system; and
   wherein the computer is further caused to receive more than one media control instruction and simultaneously transform the content of the electronic media into more than one format.

7. The computer readable storage device of claim 6 wherein the at least one publication format includes media formats foreign to the media creation application.

8. The computer readable storage device of claim 6 wherein the at least one publication format includes at least a portable document format, a hypertext markup language, an x-markup language, a rich text format, a JPEG format, a GIF format, a TIFF format, encryption formats, a bitmap format, compression format and electronic messaging formats.

9. The computer readable storage device of claim 6 wherein the computer is further caused to transmit the content of the electronic media to the document management system to store the content of the electronic media in a readily identifiable data file according to the rules of the document management system.

10. The computer readable storage device of claim 6 wherein the computer is further caused to initialize the media publisher in response to a print command from the media creation application.

11. The computer readable storage device of claim 6 wherein the computer is further caused to retrieve the content of an electronic media from the document management system by using at least one of a plurality of publication parameters associated with the published content of the electronic media.

12. The computer readable storage device of claim 6 wherein the computer is further caused to electronically transmit the content of the electronic media to at least one of a supervising approver and a workflow recipient.

13. A computer readable storage medium having a computer program stored thereon and embodying a sequence of instructions that when executed by a processor causes the processor to:
   (A) access an electronic data file in response to at least one of an application print command and application open command;
   (B) display a graphical user interface (GUI) configured to facilitate user selection of a number of publication commands;
   (C) receive a user selection of at least one publication command;
   (D) route the electronic data file to a converter configured to convert the electronic data file directly into at least one of a number of publication formats compatible with a document management system;
   (E) transmit the at least one converted data file to at least one publication system capable of publishing the converted data file in the at least one publication format to the document management system; and
   (F) in response to user instructions, display a listing of document approving supervisors.

14. The computer readable storage medium of claim 13 wherein the sequence of instructions further causes the processor to display the GUI in response to a document management instruction.

15. The computer readable storage medium of claim 14 wherein the sequence of instructions further causes the processor to execute acts (A) through (E) in response to a user print instruction.

16. The computer readable storage medium of claim 15 wherein the sequence of instructions further causes the processor to recognize a user print instruction from any software application capable of printing the electronic data file.

17. The computer readable storage medium of claim 13 wherein the number of publication commands include a publish command, a compress command, and a number of conversion commands including a convert to PDF command and a convert to HTML command.

18. The computer readable storage medium of claim 13 wherein the number of publication formats include PDF, JPEG, GIF, TIFF, HTML, XML, RTF, TXT, DOC, encryption, PPT and ZIP.

19. The computer readable storage medium of claim 13 wherein the sequence of instructions further causes the processor to retrieve an electronic data file from a document management system capable of storing the electronic data file.

20. The computer readable storage medium of claim 13 wherein the sequence of instructions further causes the processor to route the converted data file to a supervisor and a subsequent document designate.

* * * * *